US011983323B2

United States Patent
Ohnishi et al.

(10) Patent No.: US 11,983,323 B2
(45) Date of Patent: May 14, 2024

(54) CONTROL DEVICE, CONTROL METHOD, AND PROGRAM

(71) Applicant: KABUSHIKI KAISHA TOKAI RIKA DENKI SEISAKUSHO, Aichi (JP)

(72) Inventors: Takeshi Ohnishi, Aichi (JP); Fumiaki Hirose, Aichi (JP); Yuma Nakai, Aichi (JP)

(73) Assignee: KABUSHIKIA KAISHA TOKAI RIKA DENKI SEISAKUSHO, Aichi (JP)

( * ) Notice: Subject to any disclaimer, the term of this patent is extended or adjusted under 35 U.S.C. 154(b) by 148 days.

(21) Appl. No.: 17/641,313

(22) PCT Filed: Apr. 17, 2020

(86) PCT No.: PCT/JP2020/016828
§ 371 (c)(1),
(2) Date: Mar. 8, 2022

(87) PCT Pub. No.: WO2021/049084
PCT Pub. Date: Mar. 18, 2021

(65) Prior Publication Data
US 2022/0350407 A1    Nov. 3, 2022

(30) Foreign Application Priority Data

Sep. 10, 2019  (JP) ................. 2019-164229

(51) Int. Cl.
*G06F 3/01*  (2006.01)
*G06F 3/16*  (2006.01)

(52) U.S. Cl.
CPC .............. *G06F 3/016* (2013.01); *G06F 3/167* (2013.01)

(58) Field of Classification Search
CPC ........ G06F 3/016; G06F 3/167; G06F 3/0488; A63F 13/285
See application file for complete search history.

(56) References Cited

U.S. PATENT DOCUMENTS 11,043,088 B2 * 6/2021 Hill ........................ G08B 6/00
2004/0062563 A1   4/2004 Tsunoda et al.
(Continued)

FOREIGN PATENT DOCUMENTS

JP   2004-219976   8/2004
JP   2004-265281   9/2004
(Continued)

OTHER PUBLICATIONS

International Search Report issued in International Bureau of WIPO Patent Application No. PCT/JP2020/016828, dated Jul. 7, 2020, along with an English translation thereof.
(Continued)

*Primary Examiner* — An T Nguyen
(74) *Attorney, Agent, or Firm* — GREENBLUM & BERNSTEIN, P.L.C.

(57) ABSTRACT

There is provided a control device that includes: a control section configured to control tactile presentation and auditory presentation when it is decided that an input section has been operated, the tactile presentation presenting a stimulation via a sense of touch, the auditory presentation presenting a stimulation via a sense of hearing, and the input section having a contact area that an object contacts, and in which the control section controls a feature amount of a waveform related to the tactile presentation and a feature amount of a waveform related to the auditory presentation such that at least one of the tactile presentation and the auditory presentation falls within an appropriate range that is a range where at least one of the tactile presentation and the auditory (Continued)

presentation is perceivable for a user of the input section and is not uncomfortable for the user.

4 Claims, 4 Drawing Sheets

(56) References Cited

U.S. PATENT DOCUMENTS

| | | | |
|---|---|---|---|
| 2007/0223727 A1* | 9/2007 | Kobayashi | B60W 50/14 381/86 |
| 2014/0210756 A1* | 7/2014 | Lee | G06F 3/03545 345/173 |
| 2016/0246374 A1* | 8/2016 | Carter | H04R 1/403 |
| 2020/0079400 A1 | 3/2020 | Ueno | |
| 2020/0167000 A1* | 5/2020 | Kang | G06F 3/0416 |
| 2022/0283640 A1* | 9/2022 | Myokan | G06F 3/016 |

FOREIGN PATENT DOCUMENTS

| | | |
|---|---|---|
| JP | 2018-036818 | 3/2018 |
| JP | 2018-097706 | 6/2018 |

OTHER PUBLICATIONS

Written Opinion issued in International Bureau of WIPO Patent Application No. PCT/JP2020/016828, dated Jul. 7, 2020.

* cited by examiner

CONTROL DEVICE, CONTROL METHOD, AND PROGRAM

TECHNICAL FIELD

The present invention relates to a control device, a control method, and a program.

BACKGROUND ART

In recent years, various devices that output feedbacks for users' operations are developed. The above devices include devices that use presentation of stimulations for users' five senses as feedback. For example, Patent Literature 1 discloses a device that outputs feedback that uses vibration and a sound for a user's operation on an operation surface.

CITATION LIST

Patent Literature

Patent Literature 1: JP 2018-36818A

SUMMARY OF INVENTION

Technical Problem

When feedback that uses a sense stimulation is output for a user's operation as disclosed in Patent Literature 1, it is important to make the user reliably perceive the feedback, and perform control such that the feedback is not disadvantageous for the user.

Therefore, the present invention has been made in light of the above problem, and an object of the present invention is to provide a mechanism that can realize feedback that further improves operability.

Solution to Problem

In order to solve the above problem, a certain aspect of the present invention provides a control device that includes: a control section configured to control tactile presentation and auditory presentation when it is decided that an input section has been operated, the tactile presentation presenting a stimulation via a sense of touch, the auditory presentation presenting a stimulation via a sense of hearing, and the input section having a contact area that an object contacts, and in which the control section controls a feature amount of a waveform related to the tactile presentation and a feature amount of a waveform related to the auditory presentation such that at least one of the tactile presentation and the auditory presentation falls within an appropriate range that is a range where at least one of the tactile presentation and the auditory presentation is perceivable for a user of the input section and is not uncomfortable for the user.

Furthermore, in order to solve the above problem, another aspect of the present invention provides a control method that includes: controlling tactile presentation and auditory presentation when it is decided that an input section has been operated, the tactile presentation presenting a stimulation via a sense of touch, the auditory presentation presenting a stimulation via a sense of hearing, and the input section having a contact area that an object contacts, and where the controlling includes controlling a feature amount of a waveform related to the tactile presentation and a feature amount of a waveform related to the auditory presentation such that at least one of the tactile presentation and the auditory presentation falls within an appropriate range that is a range where at least one of the tactile presentation and the auditory presentation is perceivable for a user of the input section and is not uncomfortable for the user.

Furthermore, in order to solve the above problem, still another aspect of the present invention provides a program that causes a computer to realize: a control function configured to control tactile presentation and auditory presentation when it is decided that an input section has been operated, the tactile presentation presenting a stimulation via a sense of touch, the auditory presentation presenting a stimulation via a sense of hearing, and the input section having a contact area that an object contacts, and causes the control function to control a feature amount of a waveform related to the tactile presentation and a feature amount of a waveform related to the auditory presentation such that at least one of the tactile presentation and the auditory presentation falls within an appropriate range that is a range where at least one of the tactile presentation and the auditory presentation is perceivable for a user of the input section and is not uncomfortable for the user.

Advantageous Effects of Invention

As described above, the present invention provides a mechanism that can realize feedback that further improves operability.

DESCRIPTION OF EMBODIMENTS

Figure 1:
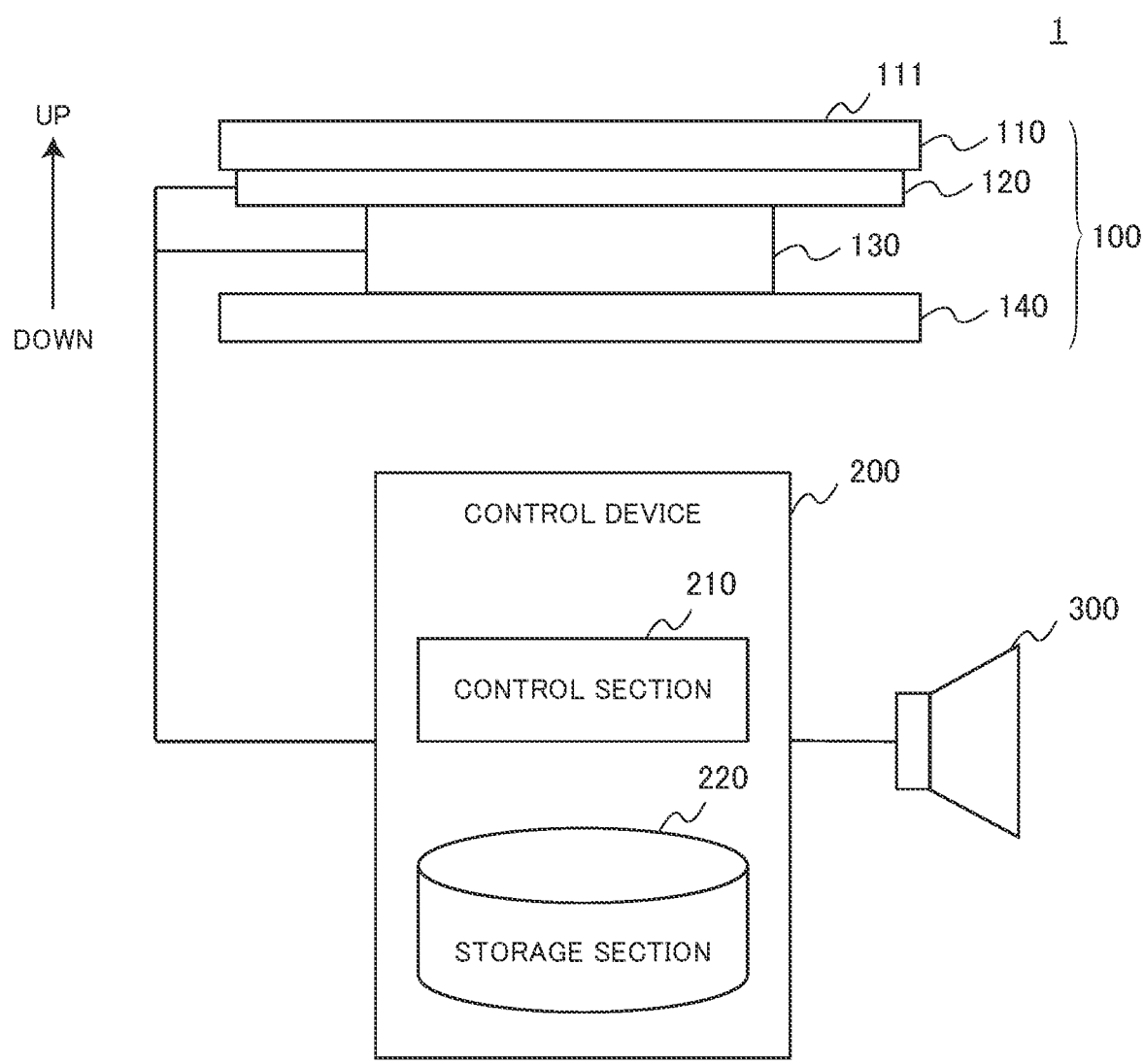
FIG. 1 is a view illustrating a configuration example of a system 1 according to an embodiment of the present invention.

A preferred embodiment of the present invention will be described in detail below with reference to the appended drawings. Note that components having substantially same functional configurations will be assigned same reference numerals in the description and the drawings, and overlapping explanation thereof will be omitted.

1. Embodiment

<<1.1. Configuration Example>>

FIG. 1 is a view illustrating a configuration example of a system 1 according to the embodiment of the present invention. As illustrated in FIG. 1, the system 1 according to the present embodiment may include an input device 100, a control device 200, and a sound output device 300.

(Input Device 100)

The input device 100 according to the present embodiment detects a user's input operation on the system 1, and outputs information related to the input operation to the control device 200. Furthermore, the input device 100 according to the present embodiment performs tactile presentation that presents a stimulation via a sense of touch of the user who has performed the above input operation based on a control signal output by the control device 200.

As illustrated in FIG. 1, the input device 100 according to the present embodiment may include, for example, an input section 110, a detection section 120, a tactile presentation section 130, and a support part 140.

The input section 110 according to the present embodiment is a component for which the user performs an input operation, and includes a contact area 111 that an object contacts upon the input operation. In this regard, the above object may be, for example, part of a body such as a user's finger, or a pen-like tool that is gripped by the user to use. The user inputs various commands to the system 1 by performing a pushing operation and a swiping operation on the contact area 111 using the finger or the above tool. The input section 110 according to the present embodiment may be, for example, various touch panels.

The detection section 120 according to the present embodiment detects contact of the object with the contact area 111 included in the input section 110, and outputs information related to the contact of the object to the control device 200. The detection section 120 according to the present embodiment may be a pressure-sensitive sensor that converts a change of a pressure that changes in response to the user's input operation on the contact area 111 into an electric signal. Furthermore, the detection section 120 may be a capacitive sensor that converts a change of a capacitance that changes in response to the user's input operation on the contact area 111 into an electric signal.

The tactile presentation section 130 according to the present embodiment is a component that presents a stimulation via a user's sense of touch. When, for example, the detection section 120 detects that the object has contacted the contact area 111 included in the input section 110, that is, when the detection section 120 decides that the input section 110 has been operated, the tactile presentation section 130 according to the present embodiment may perform tactile presentation based on a control signal output by the control device 200.

The tactile presentation section 130 according to the present embodiment may perform tactile presentation that uses, for example, a vibration stimulation. In this case, the tactile presentation section 130 may be various actuators such as an Eccentric Rotating Mass (ERM) that can cause vibration, a Linear Resonant Actuator (LRA), and a piezoelectric element.

On the other hand, the tactile presentation section 130 according to the present embodiment may be a component that performs tactile presentation accompanied by a temperature change or tactile presentation related to a force sense (e.g., presentation of a sense of being pushed by an object, presentation of a sense of contacting an object, or presentation of a sense of being tightened), or perform tactile presentation related to a cutaneous sense (e.g., presentation of a sense of roughness or presentation of a sense of smoothness). The tactile presentation section 130 according to the present embodiment can employ various configurations that support characteristics of tactile presentation to be presented.

The support part 140 according to the present embodiment is a component that supports the input section 110, the detection section 120, and the tactile presentation section 130. The support part 140 according to the present embodiment is formed by a material and in a shape matching a specification of the system 1.

(Control Device 200)

The control device 200 according to the present embodiment controls operations of the input device 100 and the sound output device 300. As illustrated in FIG. 1, the control device 200 according to the present embodiment may include a control section 210 and a storage section 220.

When the detection section 120 decides that the object has contacted the contact area 111 included in the input section 110, or when the detection section 120 decides that a specified input operation has been performed based on an electric signal output by the detection section 120, the control section 210 according to the present embodiment controls tactile presentation of the tactile presentation section 130 and auditory presentation of the sound output device 300 that is presentation of a stimulation via a user's sense of hearing. In this case, one of features of the control section 210 according to the present embodiment is that the control section 210 controls a feature amount of a waveform related to tactile presentation and a feature amount of a waveform related to auditory presentation such that at least one of the tactile presentation and the auditory presentation falls within an appropriate range that is a range where at least one of the tactile presentation and the auditory presentation is perceivable for the user and is not uncomfortable for the user. A function of the control section 210 is configured by, for example, an electronic circuit such as a Central Processing Unit (CPU) or a microprocessor. Details of the function of the control section 210 according to the present embodiment will be separately described in detail.

The storage section 220 according to the present embodiment stores various pieces of information related to operations of the input device 100, the control device 200, and the sound output device 300. The storage section 220 stores, for example, information for defining a mode of tactile presentation output by the input device 100 and a mode of auditory presentation output by the sound output device 300.

(Sound Output Device 300)

The sound output device 300 according to the present embodiment performs auditory presentation based on a control signal output by the control device 200. The sound output device 300 according to the present embodiment may be, for example, a speaker.

The configuration example of the system 1 according to the present embodiment has been described above. Note that the above configuration described with reference to FIG. 1 is a mere example, and the configuration of the system 1 according to the present embodiment is not limited to this example. For example, each function of the input device 100, the control device 200, and the sound output device 300 according to the present embodiment may be realized by a single device.

The configuration of the system 1 according to the present embodiment can be flexibly altered according to a specification and an operation.

<<1.2. Details>>

Next, control of tactile presentation and auditory presentation according to the present embodiment will be described in detail. The control section 210 according to the present embodiment causes the tactile presentation section 130 to output tactile presentation as feedback of a user's input operation on the input section 110, and causes the sound output device 300 to output auditory presentation in synchronization with the tactile presentation. Thus, by performing tactile presentation and auditory presentation in synchronization, it is possible to more clearly learn that the user's input operation has been recognized by the system 1 compared to a case where only one of the tactile presentation and the auditory presentation is performed.

On the other hand, even when tactile presentation and auditory presentation are performed in synchronization, it is assumed that a sense perceived or an impression recalled by the user is different depending on each presentation mode.

When, for example, a timing of vibration used for tactile presentation is too late, it is assumed that the user has difficulty in perceiving feedback. Furthermore, when, for example, a sound used for auditory presentation is too sharp, there is a probability that the user feels that feedback is uncomfortable.

To avoid the above situation, what is important is to precisely specify the appropriate range that is the range where at least one of tactile presentation and auditory presentation is perceivable for the user, and is not uncomfortable for the user, and control the tactile presentation and the auditory presentation according to the appropriate range. Furthermore, when control is performed such that the tactile presentation and the auditory presentation respectively fall within the above appropriate range, it is possible to realize feedback that further improves operability.

The applicant of this application has focused on a feature amount of a waveform related to tactile presentation and a feature amount of a waveform related to auditory presentation, and conducted an experiment to specify the above appropriate range. In this regard, the above feature amount of the waveform related to the tactile presentation may be, for example, a displacement rise time. The displacement rise time may be a required time from a first time at which displacement of the input section 110 (more precisely, the contact area 111) caused by vibration is first displacement that falls within a first predetermined range from a minimal value of the displacement to a second time at which the displacement is second displacement that falls within a second predetermined range from a maximal value of the displacement. In this regard, the minimal value may be a minimum value. Furthermore, the maximal value may be a maximum value. The displacement rise time according to the present embodiment will be described in detail with reference to FIG. 2.

Figure 2:
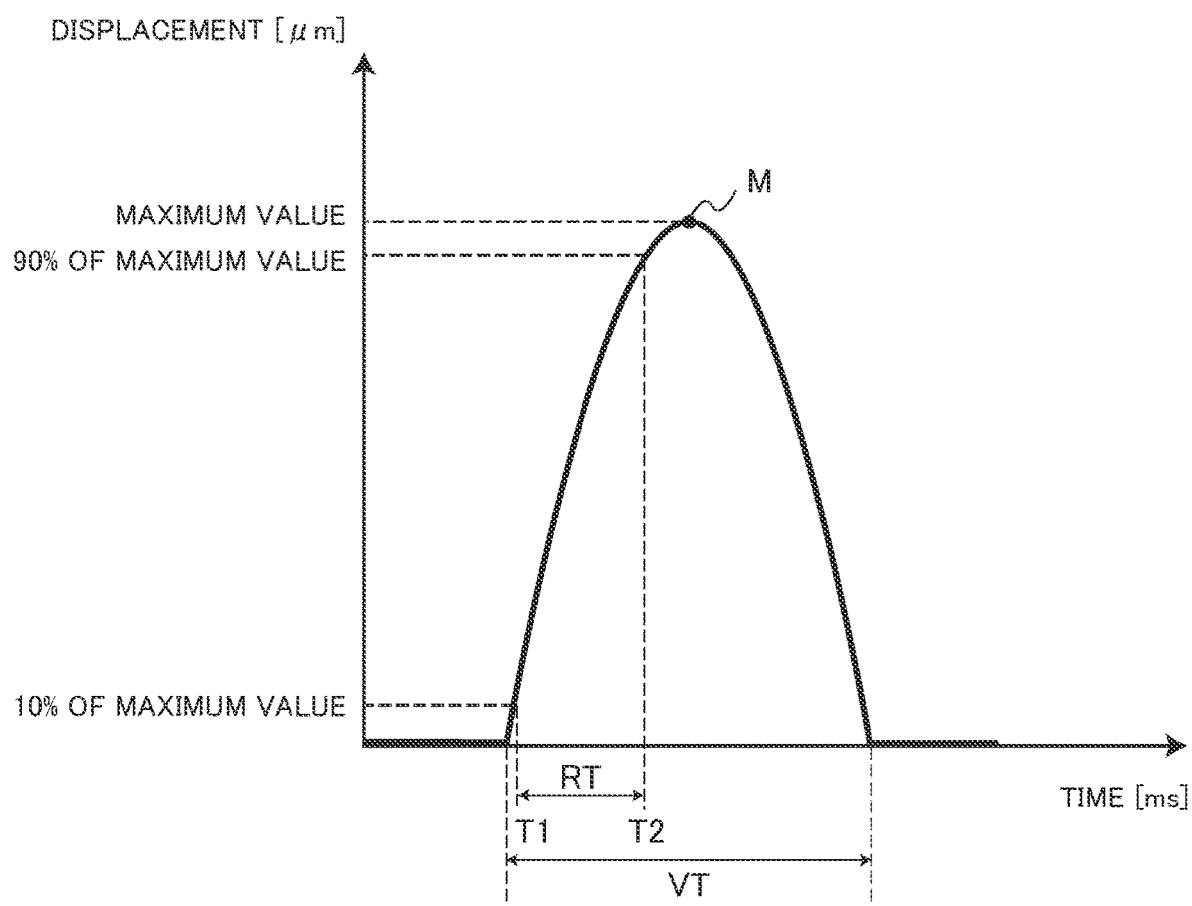
FIG. 2 is a view for explaining a displacement rise time according to the embodiment.

FIG. 2 is a view for explaining the displacement rise time according to the present embodiment. A vertical axis in FIG. 2 indicates displacement of the contact area 111 caused when a current is applied to the tactile presentation section 130. A unit of displacement is a micrometer. A horizontal axis in FIG. 2 indicates a time. A unit of a time is a millisecond. Furthermore, FIG. 2 illustrates displacement of one cycle as an example.

A vibration time VT in FIG. 2 is a time length during which the tactile presentation section 130 outputs vibration based on control of the control section 210. In an example, vibration of one cycle is output during the vibration time VT. At or after the vibration time VT, too, displacement is likely to occur due to vibration of an inertia after the vibration of the tactile presentation section 130 based on control of the control section 210 stops. In this regard, the displacement rise time that is a control parameter may be limited to a time within a period during which the input section 110 outputs vibration based on control of the control section 210. That is, a time within a time interval during which vibration occurs due to the inertia may not be included in the displacement rise time that is the control parameter. In the example illustrated in FIG. 2, the first predetermined range is 10% of a maximum value M, and the first displacement is displacement obtained by adding 10% of the maximum value M to 0 that is the minimum value. Furthermore, the second predetermined range is 10% of the maximum value M, and the second displacement is displacement that is obtained by subtracting 10% of the maximum value M from the maximum value M, that is, displacement that is 90% of the maximum value M. Hence, a displacement rise time RT is a time from a first time T1 at which displacement is 10% of the maximum value M of the displacement to a second time T2 at which the displacement is 90% of the maximum value M of the displacement.

Note that the first predetermined range may be 0, and the second predetermined range may be 0. In this case, the displacement rise time is a required time from a time at which displacement takes a minimal value (e.g., minimum value) to a time at which the displacement takes a maximal value (e.g., maximum value). In other words, the displacement rise time is a time taken until the displacement becomes maximal after vibration starts.

As the above displacement rise time becomes longer, a time taken until vibration actually occurs after contact with the contact area 111 is detected and the current is applied to the tactile presentation section 130. That is, the displacement rise time is a parameter that specifies a time taken until tactile presentation is presented after the user performs an input operation on the contact area 111, yet is assumed to significantly influence user's perception of feedback that uses the tactile presentation.

Next, an example of the feature amount of the waveform related to auditory presentation according to the present embodiment will be described. The feature amount of the waveform related to the auditory presentation according to the present embodiment may be, for example, a sharpness peak that is a maximum value of sharpness that indicates sound sharpness. In this regard, the sharpness is an index that indicates sound sharpness, and, above all, is an index that indicates sound sharpness perceived by a person. A typical unit of sharpness is acum. In an example, sharpness of narrow band noise that is around 1 kHz and whose sound pressure level is 60 dB corresponds to 1 acum. A sharpness peak will be described in detail with reference to FIG. 3.

Figure 3:
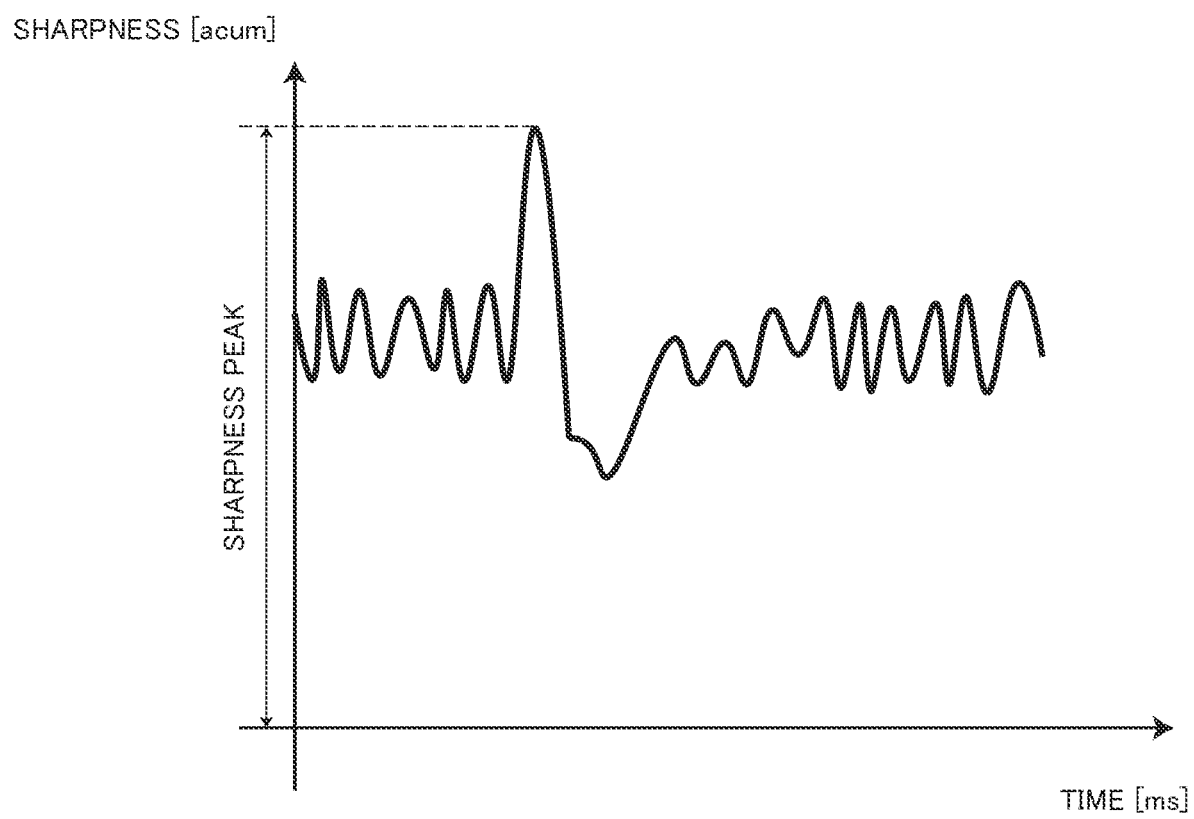
FIG. 3 is a view for explaining a sharpness peak according to the embodiment.

FIG. 3 is a view for explaining a sharpness peak according to the present embodiment. FIG. 3 illustrates a time series change of sharpness of a sound used for auditory presentation. A vertical axis in FIG. 3 indicates sharpness, and a horizontal axis in FIG. 3 indicates a time. Note that a unit of a time is a millisecond. As illustrated in FIG. 3, the sharpness peak according to the present embodiment may be a maximum value of the time series change of the sharpness of the sound used for the auditory presentation. As a value of the sharpness peak becomes larger, sound sharpness increases more, and therefore the sharpness peak is assumed to significantly influence an impression of the user on feedback that uses the auditory presentation and, more particularly, an impression related to conform and discomfort.

In an example, in an experiment, a vibration stimulation was used for tactile presentation, the feature amount of the waveform related to the tactile presentation was specified as the above-described displacement rise time, and a plurality of tactile presentations of different displacement rise times were specified. Furthermore, the feature amount of the waveform related to the auditory presentation was specified as the above-described sharpness peak, and a plurality of auditory presentations of different sound intensities were specified.

Furthermore, in the experiment, all combinations of the tactile presentation and auditory presentation specified as described above were presented as feedbacks to a plurality of subjects who operated the input section 110 in driving environment where a driving simulator of a vehicle was used, and perceptibility of the feedbacks and appropriateness of the feedbacks that is a comprehensive viewpoint were subjectively evaluated.

A result of the above experiment shows that subjects' evaluations on the perceptibility of the feedbacks decreased as the displacement rise time became longer. A factor of the result is assumed to be that, as the displacement rise time became longer, delay that caused until vibration occurred after the subjects' operations became greater, and therefore the subjects had difficulty in perceiving the tactile presentation.

Furthermore, it is found that the subjects' evaluations on the appropriateness of the feedbacks that is the comprehensive viewpoint decreased as the displacement rise time became longer and the sharpness peak became higher. A factor of the result is assumed to be that the subjects felt that the sound sharpness was uncomfortable in addition to the delay caused until the above-described vibration occurred.

The applicant of this application performed multivariate analysis that is based on the above subjects' evaluations to more precisely specify the above-described appropriate range. The multivariate analysis refers to a generic term of an analysis work of, for example, integrally summarizing multiple types of mutually related data obtained from a certain target. In this case, the applicant performed multiple regression analysis that used as an objective variable the subjects' evaluations on the appropriateness of the feedbacks that used the tactile presentation and the auditory presentation based on the above specification, and used as an explanatory variable a displacement amount related to the tactile presentation and the sound intensity related to the auditory presentation. Note that the objective variable was calculated by using following equation (1). x1 in equation (1) represents the above-described displacement rise time, and x2 represents the sharpness peak

[Equation 1]

$$\alpha + \beta \times x_1 + c \times (x_2 + d)^2 \qquad (1)$$

Figure 4:
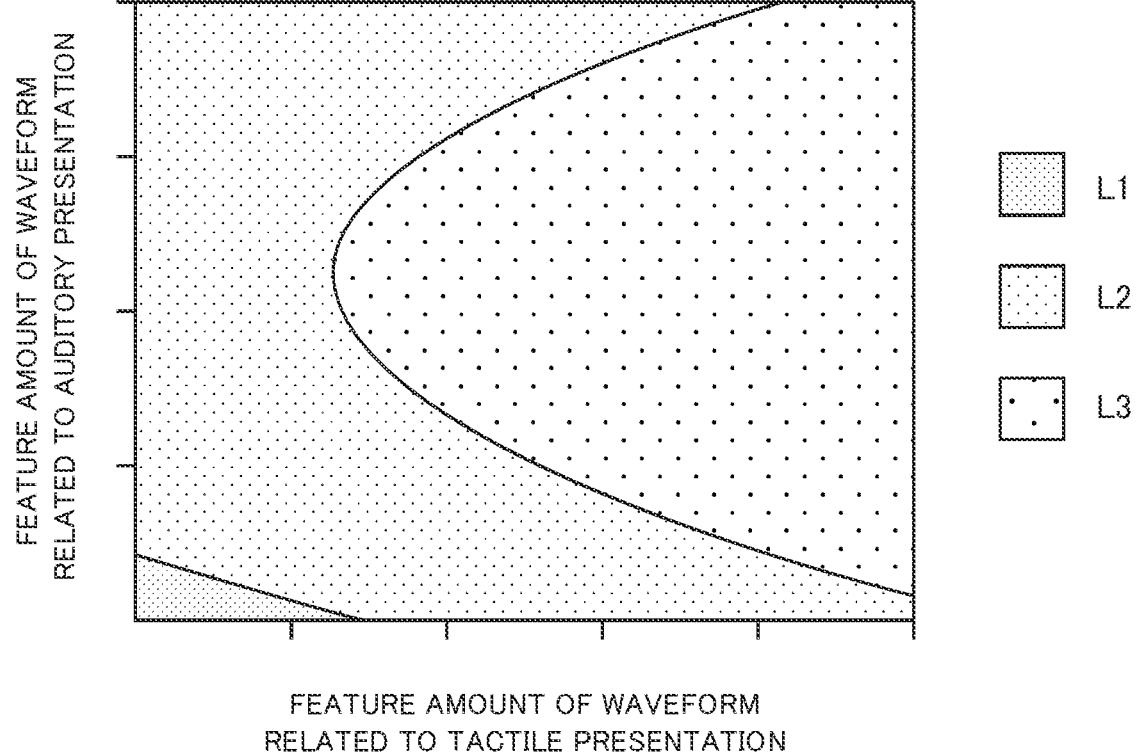
FIG. 4 illustrates mapping of a relationship between an objective variable and an explanatory variable calculated by multiple regression analysis according to the embodiment.

Furthermore, FIG. 4 illustrates mapping of a relationship between the objective variable and the explanatory variable calculated by multiple regression analysis. In FIG. 4, a horizontal axis indicates the feature amount (displacement rise time) of the waveform related to the tactile presentation, and a vertical axis indicates the feature amount (sharpness peak) of the waveform related to the auditory presentation. Furthermore, FIG. 3 illustrates averages of the subjects' evaluations as hatchings associated with a plurality of respective levels. Note that FIG. 3 illustrates part of a map including levels L1 to L3 evaluated by the subjects as preferable levels among a plurality of levels.

The levels L1 to L3 indicate that, when numerical values were smaller, the subjects evaluated that the feedbacks were more appropriate, that is, the subjects evaluated that the feedbacks were perceptible and were not uncomfortable. This shows that, by controlling each value (parameter) such that the displacement rise time and the sharpness peak fall within a range of the levels L1 to L3, it is possible to realize feedback that is perceivable and is not uncomfortable for the user.

Control of the tactile presentation and the auditory presentation according to the present embodiment has been described in detail above. According to the above-described control, it is possible to realize feedback that further improves operability.

Note that the above feedback that uses the tactile presentation and the auditory presentation is thought to be particularly effective for users who get on movable bodies such as vehicles. When, for example, a user operates the input section 110 while driving, for example, a vehicle, it is assumed that vibrations and various environmental sounds accompanying driving occur in a vehicle interior. In this case, for example, in a case where feedback that uses only tactile presentation is performed in a situation that vibration of the movable body is violent, or in a case where feedback that uses only auditory presentation is performed in a situation that an environmental sound is loud, an accident that the user cannot perceive the feedbacks is also assumed.

On the other hand, the control section 210 according to the present embodiment performs feedback that uses both of the tactile presentation and the auditory presentation based on the objective variable calculated by the above-described multivariate analysis, so that it is possible to realize appropriate feedback that is perceivable and is not uncomfortable for the user even in the above situation. Thus, the control section 210 according to the present embodiment may control output of tactile presentation and auditory presentation of an operation of the input section 110 performed by the user who gets on a movable body. Note that, although multiple regression analysis has been described above as an example of multivariate analysis, the objective variable according to the present embodiment may be obtained by, for example, discriminant analysis, logistic regression analysis, quantification theory type 1, or quantification theory type 2. Furthermore, an experiment method may be designed according to characteristics of multivariate analysis to be adopted.

2. Supplementary Explanation

Heretofore, the preferred embodiment of the present invention has been described in detail with reference to the appended drawings. However, the present invention is not limited to this embodiment. It should be understood by those who have common knowledge in the technical field to which the present invention belongs that it is obvious that various change examples or alteration examples can be arrived at within the scope of the technical idea recited in the claims, and these change examples and alteration examples also naturally belong to the technical scope of the present invention.

For example, the case where the appropriate range is defined by multivariate analysis that uses the evaluations on the tactile presentation and the auditory presentation as an objective variable, and the feature amount of the waveform related to the tactile presentation and the feature amount of the waveform related to the auditory presentation are controlled such that the tactile presentation and the auditory presentation respectively fall within the appropriate range has been described above citing an example. On the other hand, the appropriate range according to the present embodiment may be defined separately for each of tactile presentation and auditory presentation. In this case, the control section 210 may control the feature amount of the waveform related to the tactile presentation and the feature amount of the waveform related to the auditory presentation such that at least one of the tactile presentation and the auditory presentation falls within the appropriate range.

Furthermore, for example, a vibration stimulation has been described above as an example of tactile presentation. However, the tactile presentation according to the present invention is not limited to this example. The tactile presentation according to the present embodiment may be tactile presentation accompanied by a temperature change, or may be tactile presentation related to a force sense. Even in this case, by evaluating a time taken until the tactile presentation is presented after detection of a user's operation, and performing multiple regression analysis, it is possible to specify the time at which the tactile presentation falls within the appropriate range.

Furthermore, a series of processes of each device described in this description may be realized by using one of software, hardware, and a combination of the software and the hardware. Programs that configure the software are stored in advance in, for example, recording media (non-transitory media) provided inside or outside each device. Furthermore, each program is read on an RAM when, for example, executed by a computer, and is executed by a processor such as a CPU. The above recording media are, for example, magnetic disks, optical disks, magneto-optical disks, and flash memories. Furthermore, the above computer programs may be distributed via, for example, a network without using the recording media.

REFERENCE SIGNS LIST 1 system
100 input device
110 input section
111 contact area
120 detection section
130 tactile presentation section
140 support part
200 control device
210 control section
220 storage section
300 sound output device

The invention claimed is:

1. A control device, comprising:
a processor configured to control tactile presentation and auditory presentation when the processor decides that an input has been operated, the tactile presentation presenting a stimulation via a sense of touch, the auditory presentation presenting a stimulation via a sense of hearing, and the input including a contact area that an object contacts,
wherein the processor controls a first feature amount of a first waveform related to the tactile presentation and a second feature amount of a second waveform related to the auditory presentation such that at least one of the tactile presentation and the auditory presentation falls within an appropriate range where at least one of the tactile presentation and the auditory presentation is perceivable for a user of the input and is not uncomfortable for the user,
the first feature amount of the first waveform related to the tactile presentation is a displacement rise time that is a required time from a first time to a second time, the first time being at which displacement of the contact area caused by vibration is a first displacement that falls within a first predetermined range from a minimal value of the displacement, and the second time being at which the displacement is a second displacement that falls within a second predetermined range from a maximal value of the displacement,
the second feature amount of the second waveform related to the auditory presentation is a sharpness peak that is a maximum value of sharpness that indicates sound sharpness,
the processor performs the control such that the displacement rise time and the sharpness peak fall within the appropriate range, and
the appropriate range is defined by a multivariate analysis that uses an evaluation of the tactile presentation and the auditory presentation as an objective variable, and uses the displacement rise time and the sharpness peak as at least one explanatory variable.

2. The control device according to claim 1,
wherein the processor controls output of the tactile presentation and the auditory presentation for the operation of the input performed by the user who gets on a movable body.

3. A control method for a control device, the control device including a processor configured to control tactile presentation and auditory presentation when the processor decides that an input has been operated, the tactile presentation presenting a stimulation via a sense of touch, the auditory presentation presenting a stimulation via a sense of hearing, and the input including a contact area that an object contacts, the control method comprising:
controlling a first feature amount of a first waveform related to the tactile presentation and a second feature amount of a second waveform related to the auditory presentation such that at least one of the tactile presentation and the auditory presentation falls within an appropriate range where at least one of the tactile presentation and the auditory presentation is perceivable for a user of the input and is not uncomfortable for the user,
wherein the first feature amount of the first waveform related to the tactile presentation is a displacement rise time that is a required time from a first time to a second time, the first time being at which displacement of the contact area caused by vibration is a first displacement that falls within a first predetermined range from a minimal value of the displacement, and the second time being at which the displacement is a second displacement that falls within a second predetermined range from a maximal value of the displacement,
the second feature amount of the second waveform related to the auditory presentation is a sharpness peak that is a maximum value of sharpness that indicates sound sharpness,
the control method performs control such that the displacement rise time and the sharpness peak fall within the appropriate range, and
the appropriate range is defined by a multivariate analysis that uses an evaluation of the tactile presentation and the auditory presentation as an objective variable, and uses the displacement rise time and the sharpness peak as at least one explanatory variable.

4. A non-transitory computer readable storage medium storing a program, the program causing a computer to:
control tactile presentation and auditory presentation when the computer decides that an input has been operated, the tactile presentation presenting a stimulation via a sense of touch, the auditory presentation presenting a stimulation via a sense of hearing, and the input including a contact area that an object contacts,
wherein the program causes the computer to control a first feature amount of a first waveform related to the tactile presentation and a second feature amount of a second waveform related to the auditory presentation such that at least one of the tactile presentation and the auditory presentation falls within an appropriate range where at least one of the tactile presentation and the auditory presentation is perceivable for a user of the input and is not uncomfortable for the user,
the first feature amount of the first waveform related to the tactile presentation is a displacement rise time that is a required time from a first time to a second time, the first time being at which displacement of the contact area caused by vibration is a first displacement that falls within a first predetermined range from a minimal value of the displacement, and the second time being at which the displacement is a second displacement that falls within a second predetermined range from a maximal value of the displacement, the second feature amount of the second waveform related to the auditory presentation is a sharpness peak that is a maximum value of sharpness that indicates sound sharpness, the computer performs the control such that the displacement rise time and the sharpness peak fall within the appropriate range, and the appropriate range is defined by a multivariate analysis that uses an evaluation of the tactile presentation and the auditory presentation as an objective variable, and uses the displacement rise time and the sharpness peak as at least one explanatory variable.

\* \* \* \* \*